United States Patent [19]

Klock et al.

[11] Patent Number: 5,024,102
[45] Date of Patent: Jun. 18, 1991

[54] DEVICE FOR TESTING TRAILER COUPLINGS UNDER LOADING CONDITIONS RESEMBLING THOSE OCCURRING IN USE, PREFERABLY WITH INCLUSION OF THE CONSTRUCTION FOR FIXING THE TRAILER COUPLING

[75] Inventors: Jürgen Klock, Otzberg; Gerhard Fischer, Darmstadt; Vatroslav Grubisic, Reinheim, all of Fed. Rep. of Germany

[73] Assignee: Fraunhofer-Gesellschaft, Fed. Rep. of Germany

[21] Appl. No.: 431,328

[22] Filed: Nov. 3, 1989

[30] Foreign Application Priority Data

Nov. 8, 1988 [DE] Fed. Rep. of Germany ....... 3837886

[51] Int. Cl.$^5$ .............................................. G01N 3/10
[52] U.S. Cl. ...................................... 73/798; 73/865.9
[58] Field of Search ..................... 73/865.9, 794, 796, 73/797, 798, 862.57

[56] References Cited

U.S. PATENT DOCUMENTS 3,696,663 10/1972 Klinger ................................. 73/794
3,713,330 1/1973 Lentz .................................... 73/798
4,133,201 1/1979 Klinger .............................. 73/865.9

FOREIGN PATENT DOCUMENTS 0564572 7/1977 U.S.S.R. ............................ 73/865.9

Primary Examiner—Charles A. Ruehl
Attorney, Agent, or Firm—Ostrolenk, Faber, Gerb & Soffen

[57] ABSTRACT

The invention provides a device for testing trailer couplings which transmit a traction to a trailer by way of a trailer coupling ring on the drawbar of the trailer, the test being carried out under loading conditions similar to those occurring in practice, preferably with inclusion of the construction for fixing the trailer coupling, in particular the tail cross-member to which the trailer coupling is attached and optionally frame parts adjoining the tail cross-member. A longitudinal force generating device which produces a longitudinal force acting in the direction of traction of the connection between the trailer coupling and the trailer coupling ring and a vertical force generating device which produces a vertical force extending perpendicularly or approximately perpendicularly to the direction of action of the traction are coupled to a force transmitting connecting member to which can be attached the trailer coupling ring which is connected to the trailer coupling. The parts are coupled together in such a manner that the direction of action of the vertical force exerted on the force transmitting connecting member by the vertical force generating device and the direction of action of the longitudinal force exerted on the force transmitting connecting member by the longitudinal force generating device intersect at the point at which the trailer coupling ring is attached to the trailer coupling.

14 Claims, 3 Drawing Sheets

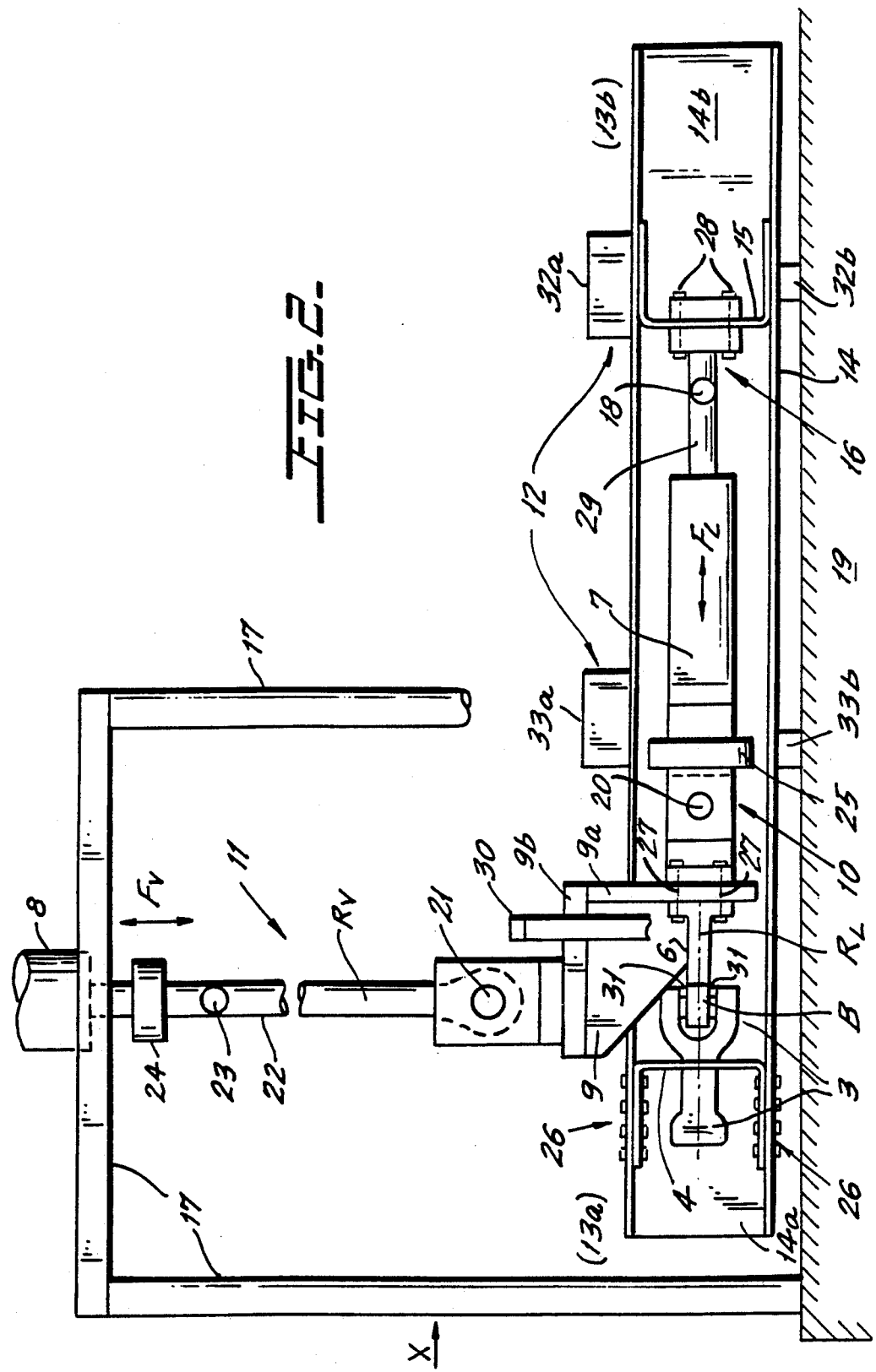

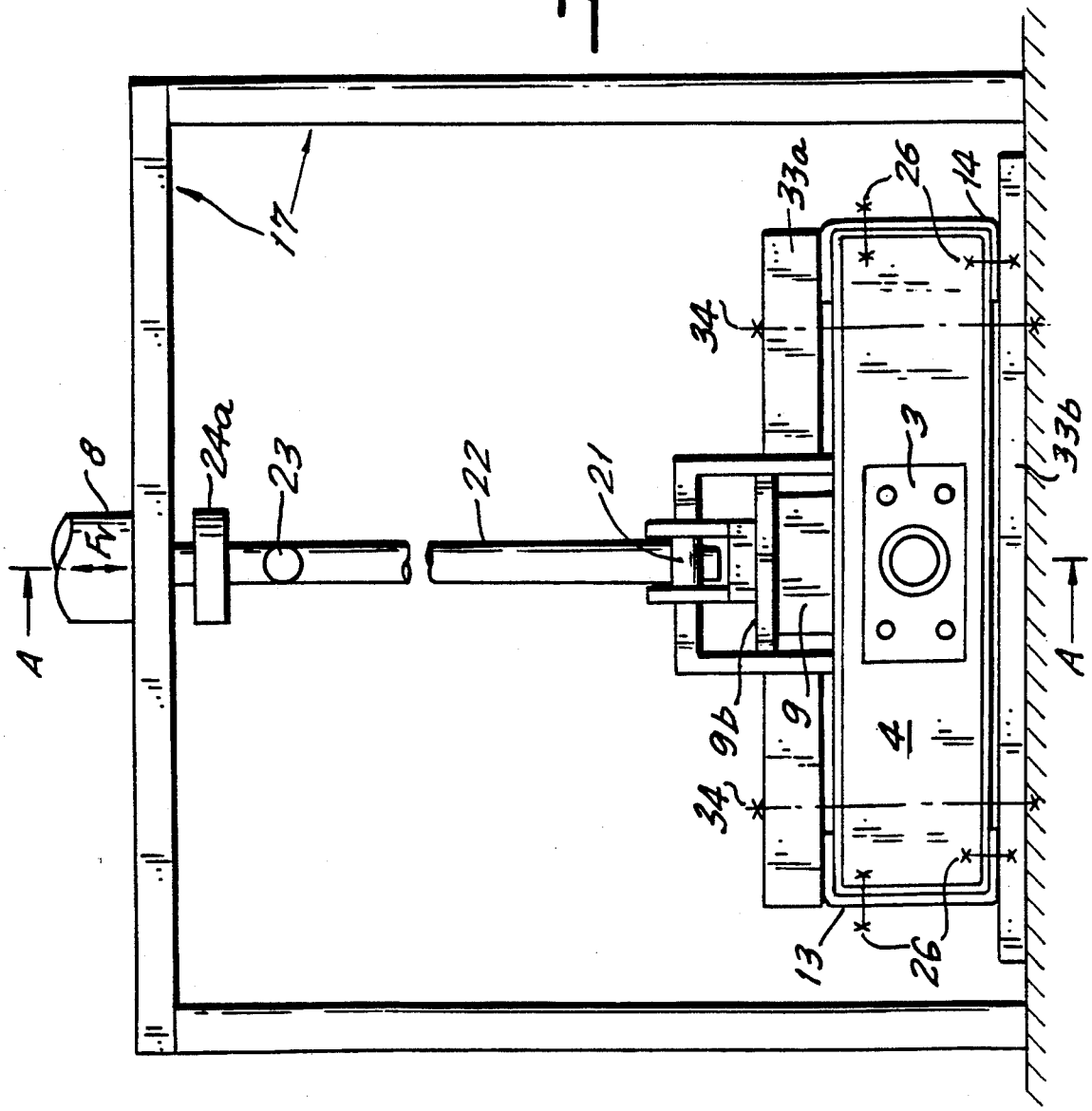

DEVICE FOR TESTING TRAILER COUPLINGS UNDER LOADING CONDITIONS RESEMBLING THOSE OCCURRING IN USE, PREFERABLY WITH INCLUSION OF THE CONSTRUCTION FOR FIXING THE TRAILER COUPLING

This invention relates to a device for testing trailer couplings which transmit a tractive force to a trailer by way of a trailer coupling ring on the drawbar of the trailer, the test being carried out under loading conditions resembling those occurring in practice, preferably with inclusion of the construction for fixing the trailer coupling, in particular the tail cross-member to which the trailer coupling is attached and optionally frame parts adjoining this cross-member.

Trailers are connected to tractors by means of trailer couplings which in the case of commercial vehicles are in most cases attached to a so-called tail cross-member which, viewed in the direction of travel, is the last of several cross-members forming a connection between two longitudinal members.

In the trailers hitherto used, the drawbar is mounted to be movable in the vertical direction so that when in use, i.e. when a tractor is travelling with trailer attached, only loads in the form of longitudinal forces act on the trailer coupling and the tail cross-member, i.e. loads which act in the longitudinal direction of the drawbar.

In more recent types of trailers, the drawbar 1 is rigidly connected to the trailer 2, as illustrated in FIG. 1, so that not only longitudinal forces $F_L$ but also powerful vertical forces $F_V$ are produced in the trailer couplings 3 which are fixed to the tail cross-member 4 of the tractor 5 and are connected to the trailer 2 by means of a trailer coupling ring 6 situated at the front end of the drawbar 1. Such vertical forces may occur, for example, when the rear axle of the tractor 5 moves over an obstruction and the vertical movement counteracts the mass moment of inertia of the trailer 2. The lateral forces, i.e. the forces acting on the trailer coupling 3 and through these on the tail cross-member 4 in a direction perpendicular to the longitudinal forces $F_L$ and to the vertical forces $F_V$, are negligible.

The vertical forces $F_V$ produce large bending stresses in the trailer coupling and cause bending of the tail cross-member. The forces which come into play may be any combinations of vertical force $F_V$ and longitudinal force $F_L$, which requires suitable dimensioning of the trailer coupling and of the construction for fixing the trailer coupling, in particular the tail cross-member and possibly also the longitudinal members. The test hitherto carried out on trailer couplings for this purpose consisted only of exerting a varying longitudinal force to prove that the couplings were strong enough for operational purposes.

It is an object of the present invention in particular to provide a device for testing trailer couplings under loading conditions resembling those occurring in use, preferably with inclusion of the construction for fixing the trailer coupling, in particular the tail cross-member to which the trailer coupling is attached and optionally also other parts of the frame adjoining the tail cross-member. This testing device is intended to provide evidence for the required operational strength of the trailer couplings and preferably also of their fixing means under multi-axial loads. The device should in particular provide evidence for resistance to oscillation in the case of tail cross-members and trailer couplings of the type used for trailers with central coupling poles and test for resistance to oscillation when longitudinal and vertical forces are superimposed on each other. The testing device should also be able to simulate the correlations in time between the various vertical and longitudinal forces occurring in use so that every region of all the parts mentioned can be put under the stresses occurring in use and tested.

The present invention solves this problem by means of a device of the type defined above in that a longitudinal force generating device which produces a longitudinal force $F_L$ acting in the direction of traction of the connection between the trailer coupling and the trailer coupling ring and a vertical force generating device which produces a vertical force $F_V$ acting perpendicularly or approximately perpendicularly to the direction of traction are coupled in such a manner to a force transmitting connecting member to which the trailer coupling ring can be attached that the direction of action of the vertical force $F_V$ exerted on the force transmitting connecting member by the vertical force generating device and the direction of action of the longitudinal force $F_L$ exerted on the force transmitting connecting member by the longitudinal force generating device intersect in the region of the point at which the trailer coupling ring is attached to the trailer coupling.

This arrangement enables the trailer coupling to be subjected simultaneously to virtually any combinations of longitudinal force $F_L$ and vertical force $F_V$ so that all the different loads which can possibly occur when a trailer is in use under any loading conditions, including maximum loading, can be simulated and reliable data can thus be obtained for dimensioning the trailer coupling, including the construction for fixing the trailer coupling, in particular the tail cross-member, since the trailer coupling, including the construction for fixing the coupling, can be subjected to the aforesaid combinations of longitudinal force and vertical force.

For the latter purpose, the device according to the invention is preferably designed with a clamping device for clamping the longitudinal members which are attached to the tail cross-member to which the trailer coupling is fixed. This clamping device is preferably so designed that the longitudinal members are only clamped at specified positions along their length which are at some distance from the tail cross-member so that the trailer coupling is suspended more or less in cantilever fashion in the tail cross-member and the end regions of the longitudinal members in much the same way as a trailer coupling is normally fixed in a tractor.

In such a case, a particularly compact construction of the device according to the invention is obtained by attaching the tail cross-member to one end of the longitudinal members in such a manner that the trailer coupling attached thereto faces the other end of the longitudinal members, in which a support member for the longitudinal force generating device may be provided. This support may in particular consist of a cross-member to which the end of the longitudinal force generating device remote from the trailer coupling is attached.

In that case the clamping device may be so designed that on the one hand the construction for fixing the trailer coupling, comprising the aforesaid cross-member, the two longitudinal members and the tail cross-member, and on the other hand the longitudinal force generating device including the force transmitting connecting member and the trailer coupling ring are clamped by said clamping device at the position of the aforesaid cross-member and in a position which, viewed along the length of the longitudinal members, is between the force transmitting connecting member and the aforesaid cross-member.

In a preferred embodiment, the force transmitting connecting member is an angle piece composed of two arms at right angles to one another, the longitudinal force generating device acting on one of these arms and the trailer coupling ring being attachable to this arm while the vertical force generating device acts on the other arm.

The longitudinal force generating device and the vertical force generating device are hingeably connected each to the force transmitting connecting member and/or to its support.

If these hinge connections are axial joints whose axes are at right angles both to the direction of action of the longitudinal force $F_L$ and to the direction of action of the vertical force $F_V$, then no separate guide means are required for the force transmitting connecting member.

However, other types of joint connections may be used for this purpose, for example, short plates which can bend in the direction of action of the given force, namely the longitudinal force $F_L$ or the vertical force $F_V$, in which case the force transmitting connecting member, in particular the above-mentioned angle piece, is guided in the direction of action of the longitudinal force $F_L$ and/or in the direction of action of the vertical force $F_V$. In particular, the force transmitting connecting member may be guided in the plane containing the direction of action of the longitudinal force $F_L$ and the direction of action of the vertical force $F_V$ or in a plane parallel to this plane so that it can oscillate within this plane. For this purpose, the guide may be in the form of a lateral guide for the force transmitting connecting member. In that case, ball-and-socket joints, for example, may also be used.

Lastly, it should be mentioned that the longitudinal force generating device and/or the vertical force generating device preferably consists of a servo-hydraulic piston and cylinder device.

The invention will now be described in more detail with reference to a particularly preferred embodiment illustrated in FIGS. 2 and 3 of the drawing in which FIG. 1 is a side view of a tractor trailer in which the trailer is connected to the tractor by means of a draw bar rigidly attached to the trailer and a trailer coupling:

FIG. 2 represents a section taken on the line A—A of FIG. 3 through a preferred embodiment of a device according to the invention:

FIG. 3 is an end view of the embodiment of the device according to the invention shown in FIG. 2.

Figure 1:
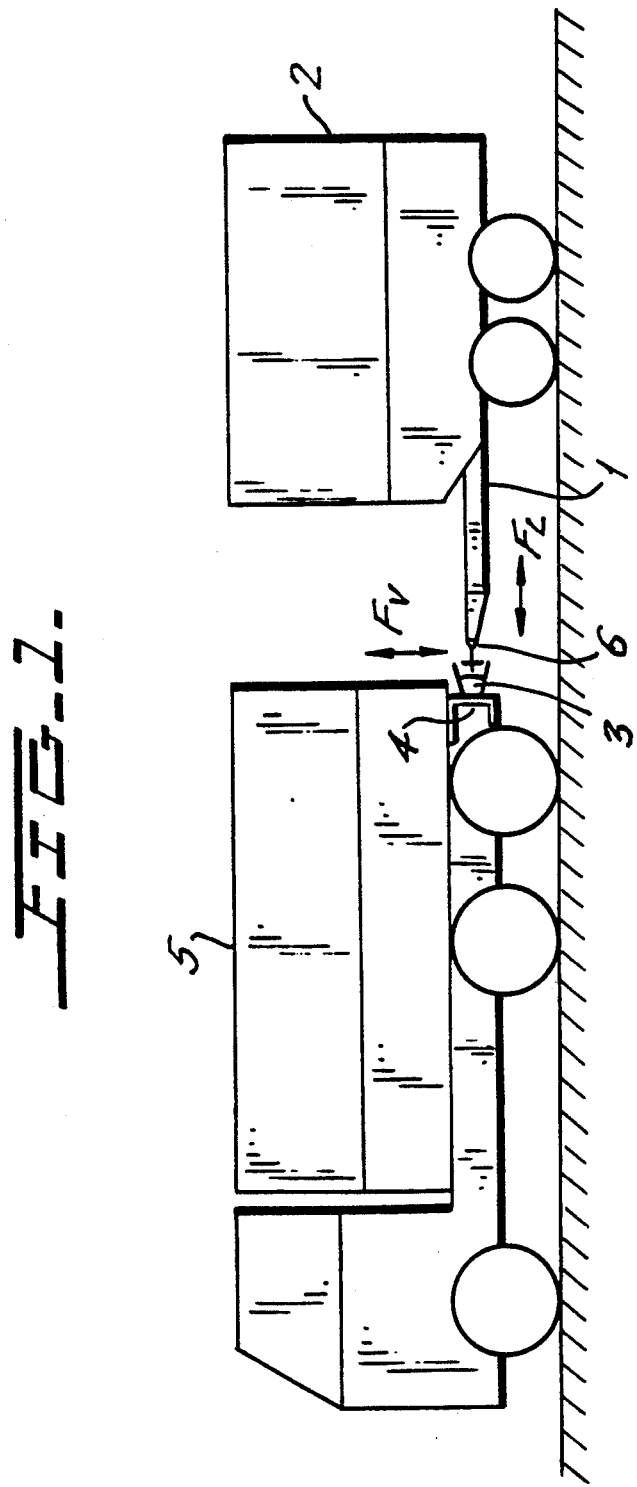

Reference will now be made more particularly to FIGS. 2 and 3 to describe in detail the embodiment shown in these Figures of a device for testing trailer couplings, including the construction for fixing the trailer coupling, under conditions similar to those occurring in use.

The said device, which may also be described as a test device for testing the performance of trailer couplings under multiaxial loads and of their fixing means, comprises the following main parts in the embodiment illustrated:

(a) A longitudinal force generating device 7 which produces a longitudinal force $F_L$ acting in the direction of traction of the connection between a trailer coupling 3 which is to be tested and the trailer coupling ring 6 connected thereto.

(b) A vertical force generating device 8 which produces a vertical force $F_V$ extending at right angles or approximately at right angles to the aforesaid direction of action of the traction.

(c) A force transmitting connecting member 9 to which the trailer coupling ring 6 can be attached.

(d) A longitudinal force coupling device 10 which connects the longitudinal force generating device 7 with the force transmitting connecting member 9 and transmits the generated longitudinal force $F_L$ to said connecting member 9.

(e) A vertical force coupling device 11 which connects the vertical force generating device 8 to the force transmitting member 9 and transmits the vertical force $F_V$ to said connecting member 9.

(f) A clamping device 12 for clamping in a fixed position the trailer coupling 3 including the construction for fixing the trailer coupling, said construction comprising in the present case the tail cross-member 4 and two longitudinal members 13,14, the tail cross-member 4 being fixed in such a manner to the longitudinal members 13,14 in the region of one end 13a and 14a, respectively, of each longitudinal member that the trailer coupling 3 faces the other ends 13b, 14b, i.e. the ends where the two longitudinal members 13, 14 are connected together by a cross-member 15.

(g) A support member 16 for the longitudinal force generating device 7, which support member in the present case is formed substantially by the above-mentioned cross-member 15 to which that end of the longitudinal force generating device 7 which is remote from the trailer coupling 3 is attached by a joint 18 so that the longitudinal force transmitting device 7 is kept in a fixed position, apart from slight oscillations about the joint 18.

(h) A support member 17 for holding the vertical force generating device 8 in a fixed position, this member 17 being constructed in the present case as a load-bearing frame which is attached to the foundation 19 as is also the clamping device 12.

In this construction, the longitudinal force generating device 7 and the vertical force generating device 8 are connected in such a manner to the force transmitting connecting member 9 by way of the longitudinal force coupling device 10 and the vertical force coupling device that the direction of action $R_V$ of the vertical force $F_V$ exerted on the force transmitting connecting member 9 by the vertical force generating device 8 and the direction of action $R_L$ of the longitudinal force $F_L$ exerted on the force transmitting connecting member 9 by the longitudinal force generating device 7 intersect in the region of the position of connection B at which the trailer coupling ring 6 is coupled to the trailer coupling 3, preferably exactly in this position.

In the present embodiment, the force transmitting connecting member 9 is an angle piece comprising a first arm 9a and a second arm 9b which enclose a right angle and in which the plane containing the first arm 9a extends perpendicularly to the longitudinal force $F_L$ while the plane containing the second arm 9b extends perpendicularly or substantially perpendicularly to the vertical force $F_V$. The trailer coupling ring 6 is fixed on one side of the first arm 9a while the longitudinal force generating device 7 acts on the other side of this arm 9a by way of a joint 20. The vertical force generating device 8 acts on the second arm 9b by way of a joint 21 which is connected to the vertical force generating device 8 by means of a link 22 and another joint 23 and a force measuring device 24, in particular a load cell. A force measuring device 25, in particular a load cell, is similarly provided between the longitudinal force generating device 7 and the joint 20 so that the vertical force $F_V$ and/or the longitudinal force $F_L$ may be measured by means of the force measuring devices 24 and 25 and their variations in time and their combinations can be recorded by means of suitable recording instruments.

As merely indicated by x—x in the drawing, the tail cross-member 4 and the longitudinal members 13,14 are connected together by screws 26. Similar screw connections 27 are also shown between the trailer coupling ring 6, the arm 9a and the longitudinal force coupling device 10; further, screw connections 28 are indicated between the cross-member 15 and the connection 29 which extends from this cross-member 15 to the longitudinal force generating device 7 and contains the joint 18. This does not, of course, cover all the screw connections in the embodiment illustrated.

A guide for the force transmitting connecting member 9 is indicated at 30. This guides the connecting member 9 in such a manner that it can only move in the plane of the drawing or in a plane parallel thereto, in other words in a plane which contains the direction of action $R_V$ of the vertical force $F_V$ and the direction of action $R_L$ of the longitudinal force $F_L$ or in a plane parallel thereto. By this arrangement, only longitudinal forces $F_L$ and vertical forces $F_V$ and combinations of such forces but no lateral forces are transmitted to the trailer coupling 3, and the force transmitting connecting member 9 can follow bending movements of the tail cross-member 4 and/or of the ends 13a, 14a of the longitudinal members 13,14 or of these members themselves.

To avoid large longitudinal excursions of the cylinder of the vertical force generating device 8, the play between the trailer coupling ring 6 and the coupling 3 may be compensated for by intermediate members 31.

The clamping device 12 comprises pairs of clamping members 32a, 32b and 33a, 33b, between which the longitudinal members 13,14 are clamped. These clamping members are much shorter in the longitudinal direction of the longitudinal members 13,14 than the longitudinal members 13,14 themselves and are so arranged that they clamp the longitudinal members 13,14 in positions at some distance from the tail cross-member 4.

In the present case, the pair of clamping members 32a,32b is provided in the region of the transverse member 15 while the pair of clamping members 33a, 33b is positioned in the region between the force transmitting connecting member 9 and the pair of clamping members 32a,32b. The associated clamping members 32a,32b and, respectively, 33a,33b are connected together by screw connections 34.

The apparatus proposed, described and illustrated here and claimed has in particular the following advantages:

(1) Virtually any correlations in time between different vertical and longitudinal forces occurring in the course of the operation of trailer couplings can be simulated and all regions of the trailer coupling, the tail cross-member and the connection to the longitudinal members can be put under stresses similar to those occurring in practice.

(2) A compact construction of the device is achieved by means of the fact that to simulate the load occurring in practice, the trailer coupling with tail cross-member is installed in reverse in two original longitudinal members (instead of the coupling in FIG. 2 facing to the left as it normally would when installed in a motor vehicle, it is arranged to face to the right, which ensures the same conditions of bending stress as occur in practice).

(3) The movements of the force transmitting connecting member 9 occurring as a result of sagging of the trailer coupling and/or of the tail cross-member and/or the longitudinal members due to the action of the vertical force are compensated for by the joints 18,20,21 and 23 so that the coupling 3 is capable of a movement of rotation when under load, the joints 18,20,21 and 23 being preferably axial joints whose axis extends perpendicularly to the plane containing the directions of action $R_V$ of the vertical force $F_V$ and $R_L$ of the longitudinal force $F_L$.

(4) Deformation of the tail cross-member comparable to that occurring in practice may also be achieved by arranging said tail cross-member in original longitudinal members and clamping the original longitudinal members in such a manner that the rear end of said members, to which the trailer coupling and the tail cross-member are attached, is free to deform under the bending forces produced by the vertical force $F_V$ and the longitudinal force $F_L$. Further, the connection between the tail cross-member and the longitudinal members may be investigated at the same time.

(5) In the event of damage to the longitudinal members due to fatigue, the whole part of the device situated between the longitudinal members can be pushed in the longitudinal direction of said longitudinal members and fixed in some other position of the longitudinal members, i.e. the point of attachment of the tail cross-member 4 and the point of attachment of the cross-member 15 can be shifted in the longitudinal direction of the longitudinal members 13,14 for new tests.

It should be pointed out that that end of the longitudinal force generating device which is remote from the trailer coupling need not necessarily be fixed to the longitudinal members although this is preferred owing to the advantageous construction then obtained.

We claim:

1. An apparatus for testing a trailer coupling assembly, wherein said assembly includes at least a trailer coupling and a trailer coupling ring engaged therewith and is subjected to testing under operational forces, including longitudinal and vertical operational forces, said apparatus comprising:
    (a) first support means for supporting the coupling assembly and for positionally fixing said coupling;
    (b) second support means for supporting the coupling ring of said coupling assembly;
    (c) a longitudinal force actuator coupled to said second support means and effective for simulating the longitudinal operational forces and for applying the same to said second support means;
    (d) a vertical force actuator coupled to said second support means and effective for simulating the vertical operational forces and for applying the same to said second support means;
    (e) said second support means being a rigid force transmitting connecting member to which said longitudinal and said vertical force actuators are coupled such that the direction of action of said longitudinal operational forces and the direction of action of said vertical operational forces intersect each other in a region in which said coupling ring engages said trailer coupling.

2. The apparatus according to claim 1, wherein said force transmitting connecting member is an angle piece comprising two arms which enclose a right angle, said longitudinal force actuator being coupled to one of said arms, said vertical force actuator being coupled to the other of said arms, and said coupling ring being attachable to said one arm.

3. The apparatus according to claim 1, further comprising guide means for guiding said force transmitting connecting member in the direction of action of said longitudinal force.

4. The apparatus according to claim 1, further comprising guide means for guiding said force transmitting connecting member in the direction of action of said vertical force.

5. The apparatus according to claim 1, further comprising guide means for guiding said force transmitting connecting member in a plane containing the direction of action of said longitudinal force and the direction of action of said vertical force or in a plane parallel to said plane.

6. The apparatus according to claim 1, wherein said trailer coupling is attached to a tail cross-member, and said tail cross-member is attached to longitudinal members, said apparatus further comprising clamping means for clamping said longitudinal members at positions along the length of said members situated remotely from said tail cross-member.

7. The apparatus according to claim 6, wherein said longitudinal members carry a support member for supporting said longitudinal force actuator.

8. The apparatus according to claim 7, wherein said support member is a cross-member to which said longitudinal force actuator is fixed.

9. The apparatus according to claim 6, wherein said tail cross-member is attached to one end of each of said longitudinal members such that said trailer coupling is directed toward the other ends of said longitudinal members.

10. The apparatus according to claim 9, further comprising a support member for supporting said longitudinal force actuator, said support member being attached to said longitudinal members in the region of said other ends.

11. The apparatus according to claim 10, wherein said support member is a cross-member to which said longitudinal force actuator is fixed.

12. The apparatus according to claim 1, wherein said longitudinal force actuator is coupled flexibly to at least one of said force transmitting connecting member and a support member for supporting said longitudinal force actuator, and wherein said vertical force actuator is coupled flexibly to at least one of said force transmitting connecting member and a support member for supporting said vertical force actuator.

13. The apparatus according to claim 12, wherein said flexible couplings are axial joints whose axes are at right angles both to the direction of action of the longitudinal force and to the direction of action of the vertical force.

14. The apparatus according to claim 1, wherein at least one of said longitudinal force actuator and said vertical force actuator is a servo-hydraulic cylinder-piston device.

* * * * *